US012497470B2

(12) United States Patent
Wang et al.

(10) Patent No.: US 12,497,470 B2
(45) Date of Patent: Dec. 16, 2025

(54) $C_2C_3$ RANDOM COPOLYMER

(71) Applicant: BOREALIS AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Cornelia Tranninger, Linz (AT)

(73) Assignee: BOREALIS AG, Vienna (AT)

( * ) Notice: Subject to any disclaimer, the term of this patent is extended or adjusted under 35 U.S.C. 154(b) by 1053 days.

(21) Appl. No.: 17/613,328

(22) PCT Filed: May 20, 2020

(86) PCT No.: PCT/EP2020/064100
§ 371 (c)(1),
(2) Date: Nov. 22, 2021

(87) PCT Pub. No.: WO2020/239583
PCT Pub. Date: Dec. 3, 2020

(65) Prior Publication Data
US 2022/0227901 A1 Jul. 21, 2022

(30) Foreign Application Priority Data

May 29, 2019 (EP) .................................... 19177299

(51) Int. Cl.
*C08F 210/06* (2006.01)
*C08L 23/14* (2006.01)

(52) U.S. Cl.
CPC .......... *C08F 210/06* (2013.01); *C08L 23/142* (2013.01); *C08F 2420/07* (2021.01); *C08L 2203/162* (2013.01); *C08L 2205/025* (2013.01); *C08L 2308/00* (2013.01); *C08L 2314/06* (2013.01)

(58) Field of Classification Search
None
See application file for complete search history.

(56) References Cited

U.S. PATENT DOCUMENTS

| 2011/0065873 A1 | 3/2011 | Grein et al. |
| 2018/0244905 A1 | 8/2018 | Wang et al. |

FOREIGN PATENT DOCUMENTS

| CN | 102858869 A | 1/2013 |
| EP | 0887379 B1 | 12/1998 |
| EP | 2622013 A1 | 8/2013 |
| EP | 269268 A1 | 9/2013 |
| EP | 3064514 A1 | 9/2016 |
| JP | 2003073426 A | 3/2003 |
| JP | 2003191933 A | 7/2003 |
| RU | 2541470 C9 | 4/2010 |
| RU | 2662152 C2 | 7/2018 |
| RU | 2672108 C2 | 11/2018 |
| RU | 2676711 C1 | 1/2019 |
| WO | 1992/012182 A1 | 7/1992 |
| WO | 1994/0014856 A1 | 7/1994 |
| WO | 1995/0012622 A1 | 5/1995 |
| WO | 99/24478 A1 | 5/1999 |
| WO | 99/24479 A1 | 5/1999 |
| WO | 2000/068315 A1 | 11/2000 |
| WO | 2004/000899 A1 | 12/2003 |
| WO | 2004/111095 A1 | 12/2004 |
| WO | 2006/0097497 A1 | 9/2006 |
| WO | 2006116472 A2 | 11/2006 |
| WO | 2011/0076780 A1 | 6/2011 |
| WO | 2011131639 A1 | 10/2011 |
| WO | 2011/0135004 A1 | 11/2011 |
| WO | 2012/0001052 A3 | 1/2012 |
| WO | 2012/0084961 A1 | 6/2012 |
| WO | 2013/0007650 A1 | 1/2013 |
| WO | 2015/0158790 A2 | 10/2015 |
| WO | 2015169831 A1 | 11/2015 |
| WO | 2018/122134 A1 | 7/2018 |
| WO | 2019012110 A1 | 1/2019 |

OTHER PUBLICATIONS

Applicant: Borealis AG,AT; "C2C3 Random Copolymer"; Russian Application No. 2021136722/04 Filed May 20, 2020; Russian Search Report dated Nov. 28, 2022; 5 pgs.
Applicant: Borealis AG,AT; Russian Office Action dated Nov. 29, 2022; 25 pgs.
V. I. Tsvetkova; "Metallocene Catalysis in Processes Polymerization of a-Olefins"; Polymer Chemistry (Reviews); High Molecular Compounds, Seryl C, Apr. 19, 2000, vol. 42, No. 11, p. 1954-1973.
Zhou, Zhe, et al. "A new decoupling method for accurate quantification of polyethylene copolymer composition and triad sequence distribution with 13C NMR." Journal of Magnetic Resonance 187.2 (2007): 225-233.
Wang, Wen-Jun, and Shiping Zhu. "Structural analysis of ethylene/propylene copolymers synthesized with a constrained geometry catalyst." Macromolecules 33.4 (2000): 1157-1162.
Resconi, Luigi, et al. "Selectivity in propene polymerization with metallocene catalysts." Chemical Reviews 100.4 (2000): 1253-1346.
Busico, Vincenzo, et al., "Alk-1-Ene Polymerization in the Presence of a Monocyclopentadienyl Zirconium(IV) Acetamidinate Catalyst: Microstructural and Mechanistic Insights", Macromol. Rapid Commun. 2007, 28,1128-1137.
Cheng, et al., "13C NMR Analysis of Ethylene-Propylene Rubbers", Macromolecules 17, 1984, 1950-1955.

(Continued)

*Primary Examiner* — Fred M Teskin
(74) *Attorney, Agent, or Firm* — Tarolli, Sundheim, Covell & Tummino LLP

(57) ABSTRACT

New $C_2C_3$ random copolymer (RACO), which shows improved sealing behaviour due to low sealing initiation temperature (SIT) and high hot tack force. In addition, the inventive $C_2C_3$ random copolymer (RACO) shows an excellent sterilization behaviour, i.e. retention of low haze level after sterilization. The present invention is furthermore related to the manufacture of said $C_2C_3$ random copolymer (RACO) and to its use.

14 Claims, No Drawings

(56) References Cited

OTHER PUBLICATIONS

Kakugo, Masahiro, et al., "13C NMR Determination of Monomer Sequence Distribution in Ethylene-Propylene Copolymers Prepared with J-TiCl3-Al(C2H5)2 Cl" Macromolecules 1982, 15, 1150-1152.

Applicant: Borealis AG; "C2C3 Random Copolymer"; European Application No. 19177299.5; Extended European Search Report; Dec. 11, 2019; 17 pgs.

Applicant: Borealis AG; "C2C3 Random Copolymer"; European Application No. 19177299.5; Partial Extended European Search Report; Dec. 11, 2019; 17 pgs.

Taiwan Office Action for Patent Application No. 109116672; Apr. 13, 2021; 19 pgs.

Applicant: Borealis AG, AT; Russian Application No. 2021136722/04(007352); Filed: May 20, 2020; Russian Office Action dated Mar. 20, 2023; 16 pgs.

(D8)—Lebedev V.B. Biomodal Technologies for Production of 3rd Generation Polyethylene (Review), Control and Information processing systems, Integrated technologies and energy saving], 2011, No. 4, pp. 99-105.

$C_2C_3$ RANDOM COPOLYMER

The present invention is related to a new $C_2C_3$ random copolymer, which shows improved sealing behaviour due to low sealing initiation temperature (SIT) and high hot tack force (HTF). In addition, the inventive copolymer shows an excellent sterilization behaviour, i.e. retention of low haze level after sterilization. The present invention is furthermore related to the manufacture of said copolymer and to its use.

Polypropylenes are suitable for many applications.

For instance, polypropylene (PP) is applicable in areas where sealing properties play an important role, like in the food or medical packing industry, especially when a good combination of transparency and mechanical performance is desired. Such a combination is difficult to achieve if the material should be suitable for sealing layers of multi-layer films, which require a good balance between sealing initiation temperature (SIT) and hot tack force (HTF). A combination of lower SIT and higher HTF force allows the converter to run the lines during the packaging step at higher speeds, but the overall performance of the film construction will only be satisfactory if the sealing layer is sufficiently flexible, tough and transparent.

To ensure fast sealing, a low SIT is of advantage. By operating at lower temperature there is the benefit that the article to be sealed is not exposed to high temperatures. There are also economical advantages, since lower temperatures are of course cheaper to generate and maintain.

There are further advantages in avoiding high sealing temperatures, especially when temperature sensitive goods are to be packed.

Furthermore, it is also desired to have a packaging material with satisfactory optical properties, such as low haze and/or high clarity.

In the field of some food applications such as retort pouches or some medical applications, a sterilization treatment is needed.

The most common sterilization procedures are the use of heat (steam), radiation (beta radiation, electrons, or gamma radiation) or chemicals (usually ethylene oxide). Steam sterilization is usually carried out in a temperature range of about 120 to 130° C. Thus, the material should have a sufficient thermal stability, like a melting temperature higher than the usual steam sterilization temperature of about 120 to 130° C.

Of course, treatment of a polymer under the sterilization conditions outlined above can impair its final properties, especially the optical properties such as transparency.

Irrespective of the polymer type, a polymer must fulfil at best all desired end properties and additionally must be easily processable, i.e. it must withstand stress. However, end properties and processing properties act often in a conflicting manner.

It frequently turns out that improvement of one of the desired properties is achieved at the expense of at least one of the other properties.

Several attempts have been made to solve the above problem.

EP 3064514 B1, for example, discloses a $C_2C_3$ random copolymer composition for heat sealing comprising three polymer fractions (A), (B) and (C) with different comonomer content, whereby the composition is obtained in the presence of a metallocene catalyst.

Claimed are $C_2C_3$ random copolymer compositions comprising polymer fractions (A), (B) and (C), whereby, fraction (A) has a C2 content (C2 A) of 0.4 to 1.5 wt %, fraction (B) has a C2 content (C2 B) of 3.0 to 10.0 wt %, and fraction (C) has a C2 content (C2 C) of 7.0 to 15.0 wt %, whereby the comonomer content of the polymer fractions increases from fraction (A) to fraction (C) according to (C2 A)<(C2 B)<(C2 C), and whereby the composition is characterized by (i) a total C2 content in the range of 3.0-7.0 wt %, (ii) a melt flow rate MFR2 (230° C.) in the range of 2.0 to 15.0 g/10 min, (iii) a melting temperature Tm of from 128° C. to 145° C., (iv) a crystallization temperature Tc of from 85° C. to 110° C. and (v) a hexane soluble content determined in accordance with FDA section 177.1520 of at most 2.0 wt %.

Such compositions have a low sealing initiation temperature (SIT) but also low hot tack force (HTF). The key drawback of such compositions is the poor sterilization resistance, which results in a drastic increase in haze after sterilization.

EP 2965908 B1 discloses a PP random copolymer with ethylene, wherein (a) said propylene copolymer has a C2 content in the range of 5.3 to 9.0 wt %, a melting temperature Tm in the range of 128 to 138° C., and a xylene cold soluble (XCS) fraction in the range of 9.0 to 18.0 wt %. Said propylene copolymer comprises two fractions: a first propylene copolymer fraction (R-PP1) and a second propylene copolymer fraction (R-PP2) and said first propylene copolymer fraction (R-PP1) differs from said second propylene copolymer fraction (R-PP2) in the ethylene content.

Such compositions show already quite a good balance of SIT and HTF, but still poor sterilization resistance, which results in a drastic increase in haze after sterilization.

Therefore, there is still a need to design materials having improved sealing behaviour due to low sealing initiation temperature (SIT) and high hot tack force (HTF), and in addition having an excellent sterilization behaviour, i.e. retention of low haze level after sterilization.

The present invention is based on the finding that the above discussed needs for heat sealing applications, i.e. simultaneously having low sealing initiation temperature (SIT), high hot tack force (HTF) and excellent sterilization behaviour, can be achieved by a specific design of a $C_2C_3$ random copolymer.

Thus, according to a first aspect the present invention is directed to a $C_2C_3$ random copolymer (RACO) having
 (a) an ethylene content in the range of from 2.5 to 5.2 wt %;
 (b) a melt flow rate $MFR_2$ (230° C./2.16 kg) measured according to ISO 1133 in the range of from 1.0 to 20.0 g/10 min;
 (c) a melting temperature Tm as determined by DSC according to ISO 11357 of from 115 to 135° C. and
 (d) a xylene cold soluble (XCS) fraction of from 0.1 to below 15.0 wt %.

Preferably, the $C_2C_3$ random copolymer (RACO) comprises two polymer fractions (RACO-1) and (RACO-2), and is obtainable, preferably obtained, in the presence of a metallocene catalyst. More preferably, fraction (RACO-1) is present in an amount of 30.0 to 70.0 wt % and has an ethylene content in the range of 1.5 to 5.5 wt %, while fraction (RACO-2) is present in an amount of 70.0 to 30.0 wt % and has an ethylene content in the range of 3.5 to 7.0 wt %, whereby the ethylene content of fraction (RACO-1) is lower than the ethylene content of fraction (RACO-2).

In another aspect the present invention is related to a process for producing the $C_2C3$ random copolymer (RACO) as described above or below, whereby the $C_2C_3$ random copolymer (RACO) is prepared in a sequential polymerization process comprising at least two polymerization reactors (R1) and (R2), wherein in the first polymerization reactor (R1) a first polymer fraction (RACO-1) is produced, which is subsequently transferred into the second polymerization reactor (R2), wherein in the second polymerization reactor (R2), a second polymer fraction (RACO-2) is then produced in the presence of the first polymer fraction (RACO-1), and the polymerization takes place in the presence of a specific catalyst system comprising (i) a metallocene, (ii) a cocatalyst system comprising a boron containing cocatalyst and an aluminoxane cocatalyst and (iii) a silica support.

In a further aspect the invention is related to sterilizable or sterilized articles, preferably to sterilizable or sterilized film, comprising the $C_2C_3$ random copolymer (RACO) as described above or below, whereby the films are characterized by
(i) a sealing initiation temperature (SIT) (determined as described in the experimental part) in the range of from 80° C. to below 120° C.,
(ii) a hot-tack force determined (as described in the experimental part on 50 μm cast film) of above 1.5 N to 6.0 N,
(iii) a haze (determined according to ASTM D1003-00 on cast film with a thickness of 50 μm) of from 0.05% to below 2.00% and a haze (determined according to ASTM D 1003-00 measured on cast film with a thickness of 50 μm) after sterilization (steam sterilization at 121° C. for 30 min) of from 0.30% to below 7.00% and
(iv) a clarity (determined according to ASTM D1003-00 on cast film with a thickness of 50 μm) of at least 85.0% up to 100.0% and a clarity (determined according to ASTM D1003-00 on cast film with a thickness of 50 μm) after sterilization (steam sterilization at 121° C. for 30 min) of at least 75.0% up to 100.0%.

In one further aspect, the present invention is related to the use of the films according to the invention as sealing layer in a multi-layer film, which can be manufactured either by co-extrusion or lamination.

IN THE FOLLOWING, THE INVENTION IS DEFINED IN MORE DETAIL $C_2C_3$ Random Copolymer (RACO)

The $C_2C_3$ random copolymer (RACO) of the invention is a random copolymer of propylene and ethylene as comonomer.

The $C_2C_3$ random copolymer (RACO) is obtainable, preferably obtained, in the presence of a metallocene catalyst.

The $C_2C_3$ random copolymer (RACO) according to this invention is featured by a moderate to low ethylene comonomer content.

Accordingly, the $C_2C_3$ random copolymer (A) has an ethylene content in the range of 2.5 to 5.2 wt %, preferably in the range of from 2.7 to 5.0 wt %, more preferably in the range of from 2.8 to 4.9 wt %, and still more preferably in the range of from 3.0 to 4.8 wt %.

The $C_2C_3$ random copolymer (RACO) has a melt flow rate $MFR_2$ (230° C.) measured according to ISO 1133 in the range of from 1.0 to 20.0 g/10 min, preferably in the range of from 2.0 to 15.0 g/10 min, more preferably in the range of from 3.0 to 12.0 g/10 min and still more preferably in range of from 5.0 to 10.0 g/10 min.

In some embodiments the $C_2C_3$ random copolymer (RACO) has a melt flow rate $MFR_2$ (230° C.) measured according to ISO 1133 of at least 7.0 g/10 min.

In said embodiments the upper limit of the melt flow rate $MFR_2$ (230° C.) can be up to 20.0 g/10 min, preferably up to 15.0 g/10 min, more preferably up to 12.0 g/10 min and still more preferably up to 10.0 g/10 min.

Additionally, the $C_2C_3$ random copolymer (RACO) can be defined by the xylene cold soluble (XCS) content determined at 25° C. according ISO 16152; 2005. Accordingly, the $C_2C_3$ random copolymer (RACO) is featured by a xylene cold soluble (XCS) content of from 0.1 wt % to below 15.0 wt %, like in the range of from 0.5 to below 15.0 wt %.

Preferably, the $C_2C_3$ random copolymer (RACO) has a xylene cold soluble (XCS) content in the range of from 2.0 to below 14.0 wt % and most preferably in the range of 5.0 to below 13.0 wt %.

The $C_2C_3$ random copolymer (RACO) can be further defined by the melting temperature (Tm) measured via DSC according to ISO 11357. Accordingly, the $C_2C3$ random copolymer (A) has a melting temperature Tm in the range of from 115° C. to 135° C., preferably in the range of from 118° C. to 134° C., and more preferably in the range of from 120° C. to 133° C.

In some embodiments the $C_2C_3$ random copolymer (RACO) has a melting temperature (Tm) in the range of from 115° C. to 130° C., preferably in the range of from 118° C. to 128° C., and more preferably in the range of from 120° C. to 126° C.

In order to facilitate processing, especially film processing, it is also desirable that the $C_2C_3$ random copolymer (RACO) according to the present invention has a suitable crystallization temperature even in absence of any nucleating agents. Preferably, the $C_2C_3$ random copolymer (RACO) therefore has a crystallization temperature Tc as determined by DSC (differential scanning calorimetry) according to ISO 11357 in the range of 75° C. to 110° C., more preferably in the range of 80° C. to 105° C., like in the range of 82° C. to 100° C.

The $C_2C_3$ random copolymer (RACO) preferably also has a flexural modulus as determined according to ISO 178 on injection moulded specimens of 500 to below 1000 MPa, preferably in the range of 550 to 900 MPa, more preferably in the range of 600 to 900 MPa.

Thus, in a further embodiment the present invention is directed to a $C_2C_3$ random copolymer (RACO) having
(a) an ethylene content in the range of from 2.5 to 5.2 wt %;
(b) a melt flow rate MFR2 (230° C./2.16 kg) measured according to ISO 1133 in the range of from 1.0 to 20.0 g/10 min;
(c) a melting temperature Tm as determined by DSC according to ISO 11357 of from 115° C. to 135° C.;
(d) a xylene cold soluble (XCS) fraction of from 0.1 wt % to below 15.0 wt %,
(e) a crystallization temperature Tc as determined by DSC (differential scanning calorimetry) according to ISO 11357 in the range of 75° C. to 110° C., preferably 80° C. to 105° C. and
(f) a flexural modulus as determined according to ISO 178 on injection moulded specimens of 500 to below 1000 MPa, preferably in the range of 550 to 900 MPa.

The $C_2C_3$ random copolymer (RACO) is preferably multimodal, like bimodal in view of the comonomer content and comprises, preferably consists of polymer fractions (RACO-1) and (RACO-2).

Thus, the $C_2C_3$ random copolymer (RACO) comprises 30.0 to 70.0 wt % of polymer fraction (RACO-1) having
(i) an ethylene content in the range of from 1.5 to 5.5 wt % and
(ii) a melt flow rate MFR2 (230° C./2.16 kg) measured according to ISO 1133 in the range of from 4.0 to 15.0 g/10 min and 70.0 to 30.0 wt % of polymer fraction (RACO-2) having (i) an ethylene content in the range of from 3.5 to 7.0 wt % and (ii) a melt flow rate MFR2 (230° C./2.16 kg) measured according to ISO 1133 in the range of from 4.0 to 12.0 g/10 min, whereby the ethylene content of polymer fraction (RACO-1) is lower than the ethylene content of polymer fraction (RACO-2).

Preferably, the $C_2C_3$ random copolymer (RACO) comprises 40.0 to 70.0 wt % of polymer fraction (RACO-1) and 30.0 to 60.0 wt % of polymer fraction (RACO-2).

More preferably, the $C_2C_3$ random copolymer (RACO) comprises 45.0 to 65.0 wt % of polymer fraction (RACO-1) and 35.0 to 55.0 wt % of polymer fraction (RACO-2).

Polymer fraction (RACO-1) preferably has an ethylene content in the range of from 2.8 to 5.0 wt % and more preferably in the range of from 3.0 to 4.8 wt %.

The melt flow rate MFR2 (230° C./2.16 kg) measured according to ISO 1133 of polymer fraction (RACO-1) is preferably in the range of from 5.0 to 12.0 g/10 min.

Polymer fraction (RACO-2) preferably has an ethylene content in the range of from 3.7 to 6.5 wt % and more preferably in the range of from 3.8 to 5.5 wt %.

The melt flow rate MFR2 (230° C./2.16 kg) measured according to ISO 1133 of polymer fraction (RACO-2) is preferably in the range of from 5.0 to 10.0 g/10 min.

The $C_2C_3$ random copolymer (RACO) is therefore preferably prepared by polymerizing propylene and ethylene by a sequential polymerization process comprising at least two reactors connected in series in the presence of a metallocene catalyst.

Thus, the $C_2C_3$ random copolymer (RACO) is preferably prepared in a sequential polymerization process comprising at least two polymerization reactors (R1) and (R2), whereby in the first polymerization reactor (R1) a first polymer fraction (RACO-1) is produced, which is subsequently transferred into the second polymerization reactor (R2). In the second polymerization reactor (R2), a second polymer fraction (RACO-2) is then produced in the presence of the first polymer fraction (RACO-1).

Polymerization processes which are suitable for producing the $C_2C_3$ random copolymer (RACO) generally comprise at least two polymerization stages and each stage can be carried out in solution, slurry, fluidized bed, bulk or gas phase.

The term "polymerization reactor" shall indicate that the main polymerization takes place. Thus in case the process consists of one or two polymerization reactors, this definition does not exclude the option that the overall system comprises for instance a pre-polymerization step in a pre-polymerization reactor. The term "consist of" is only a closing formulation in view of the main polymerization reactors.

The term "sequential polymerization process" indicates that the $C_2C_3$ random copolymer (RACO) is produced in at least two reactors connected in series.

Accordingly, such a polymerization system comprises at least a first polymerization reactor (R1) and a second polymerization reactor (R2), and optionally a third polymerization reactor (R3).

The first polymerization reactor (R1) is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention, the slurry reactor is preferably a (bulk) loop reactor.

The second polymerization reactor (R2) and the optional third polymerization reactor (R3) are preferably gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell. Preferably, in the instant process for producing the $C_2C_3$ random copolymer (RACO) as defined above the conditions for the first reactor (R1), i.e. the slurry reactor (SR), like a loop reactor (LR), of step (a) may be as follows:

the temperature is within the range of 40° C. to 110° C., preferably between 60° C. and 100° C., more preferably between 65 and 95° C., the pressure is within the range of 20 bar to 80 bar, preferably between 40 bar to 70 bar, hydrogen can be added for controlling the molar mass in a manner known per se.

Subsequently, the reaction mixture of the first reactor (R1) is transferred to the second reactor (R2), i.e. gas phase reactor (GPR1), where the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

Preferably, the $C_2C_3$ random copolymer (RACO) according to this invention is produced in the presence of a metallocene catalyst.

Thus, the $C_2C_3$ random copolymer (RACO) is produced by a process comprising the following steps:

a) polymerizing in a first reactor (R1) propylene and ethylene, obtaining polymer fraction (RACO-1) of the $C_2C_3$ random copolymer (RACO), b) transferring said polymer fraction (RACO-1) and unreacted comonomers of the first reactor in a second reactor (R2), c) feeding to said second reactor (R2) propylene and ethylene, d) polymerizing in said second reactor (R2) and in the presence of said polymer fraction (RACO-1) propylene and ethylene obtaining polymer fraction (RACO-2) said polymer fraction (RACO-1) and said polymer fraction (RACO-2) forming the $C_2C_3$ random copolymer (RACO) as defined above, whereby the polymerization takes place in the presence of a metallocene catalyst comprising (a) a complex of formula (I):

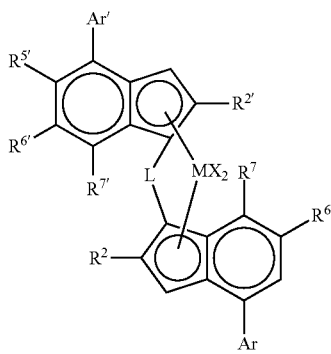

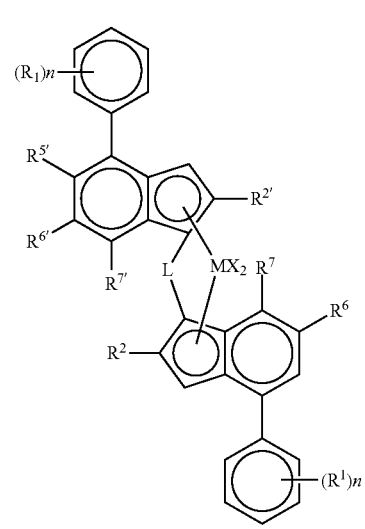

(II')

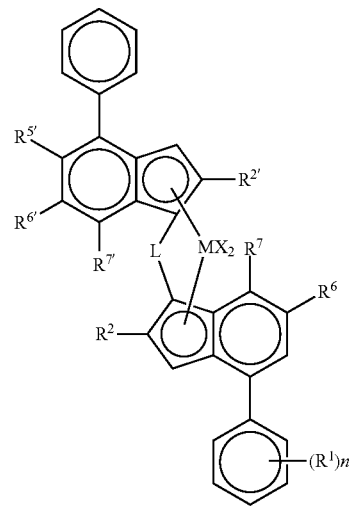

(II)

wherein

M is zirconium or hafnium;

each X is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;

$R^2$ and $R^{2'}$ are each independently a $C_1$-$C_{20}$ hydrocarbyl radical optionally containing one or more heteroatoms from groups 14-16;

$R^{5'}$ is a $C_{1-20}$ hydrocarbyl group containing one or more heteroatoms from groups 14-16 optionally substituted by one or more halo atoms;

$R^6$ and $R^{6'}$ are each independently hydrogen or a $C_{1-20}$ hydrocarbyl group optionally containing one or more heteroatoms from groups 14-16; wherein $R^{6'}$ is preferably a tertiary alkyl group $R^7$ is hydrogen or $C_{1-20}$ hydrocarbyl group optionally containing one or more heteroatoms from groups 14-16;

$R^{7'}$ is hydrogen;

Ar and Ar' are each independently an aryl or heteroaryl group having up to 20 carbon atoms optionally substituted by one or more groups $R^1$;

each $R^1$ is a $C_{1-20}$ hydrocarbyl group or two $R^1$ groups on adjacent carbon atoms taken together can form a fused 5 or 6 membered non aromatic ring with the Ar or Ar' group, said ring being itself optionally substituted with one or more groups $R^4$; each $R^4$ is a $C_{1-20}$ hydrocarbyl group;

and (ii) a cocatalyst comprising at least one or two compounds of a group 13 metal, e.g. Al and/or boron compound.

More preferably, a cocatalyst system comprising a boron containing cocatalyst, like a borate and an aluminoxane cocatalyst is used.

Even more preferably, the catalyst is supported on a silica support.

Ad Catalyst:

The catalyst used in the process of the invention is in solid particulate form. It can be supported on a conventional carrier, like silica, know to an art skilled person. Preferred complexes of use in the invention are of formula (II') or (II)

wherein

M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_{1-20}$ alkyl, $C_{3-10}$ cycloalkyl, tri($C_{1-20}$-alkyl)silyl, $C_{6-20}$-aryl, $C_{7-20}$ arylalkyl or $C_{7-20}$ alkylaryl;

each $R^2$ or $R^{2'}$ is a $C_{1-10}$ alkyl group;

$R^{5'}$ is a $C_{1-10}$ alkyl group or $Z'R^{3'}$ group;

$R^6$ is hydrogen or a $C_{1-10}$ alkyl group;

$R^{6'}$ is a $C_{1-10}$ alkyl group or $C_{6-10}$ aryl group; preferably a tertiary alkyl group;

$R^7$ is hydrogen, a $C_{1-6}$ alkyl group or $ZR^3$ group;

$R^{7'}$ is hydrogen;

Z and Z' are independently O or S;

$R^{3'}$ is a $C_{1-10}$ alkyl group, or a $C_{6-10}$ aryl group optionally substituted by one or more halo groups;

$R^3$ is a $C_{1-10}$-alkyl group;

each n is independently 0 to 4, e.g. 0, 1 or 2;

and each $R^1$ is independently a $C_{1-20}$ hydrocarbyl group, e.g. $C_{1-10}$ alkyl group.

Further preferred complexes of use in the invention are of formula (III') or (III):

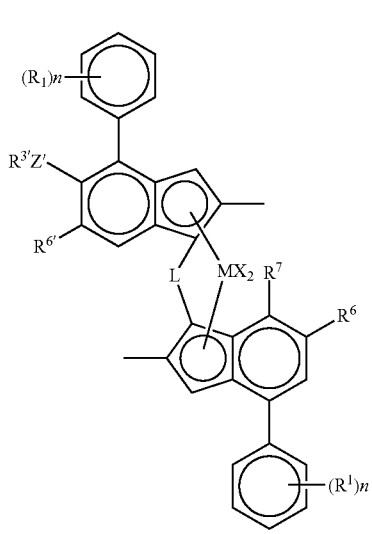
(III')

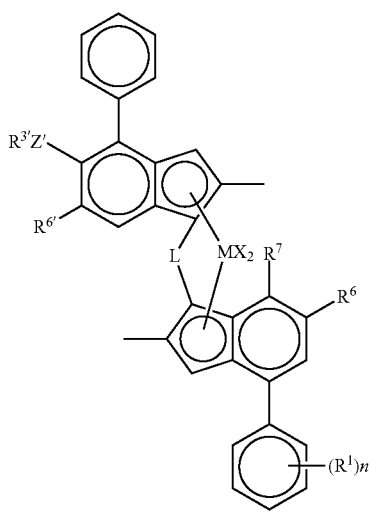
(III)

Further preferred complexes of use in the invention are of formula (IV') or (IV):

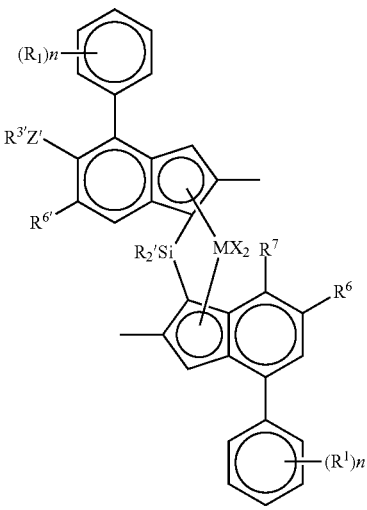
(IV')

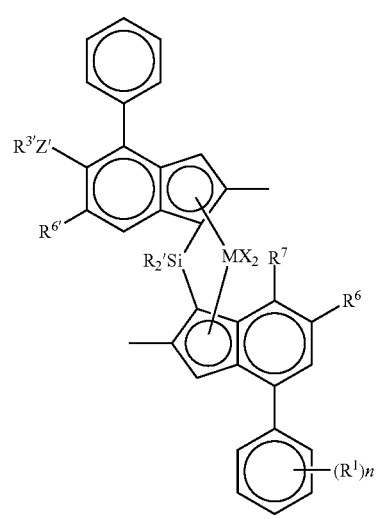
(IV)

wherein

M is zirconium or hafnium;

each X is a sigma ligand, preferably each X is independently a hydrogen atom, a halogen atom, C1.6 alkoxy group, C1.6 alkyl, phenyl or benzyl group;

L is a divalent bridge selected from —R'$_2$C- or —R'$_2$Si— wherein each R' is independently a hydrogen atom, $C_{1-20}$ alkyl or $C_{3-10}$ cycloalkyl;

$R^6$ is hydrogen or a $C_{1-10}$ alkyl group;

$R^{6'}$ is a $C_{1-10}$ alkyl group or $C_{6-10}$ aryl group, preferably a tertiary alkyl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0 to 4, e.g. 0, 1 or 2; and each $R^1$ is independently a $C_{1-10}$ alkyl group.

wherein

M is zirconium or hafnium;

each X is a sigma ligand, preferably each X is independently a hydrogen atom, a halogen atom, $C_{1-6}$-alkoxy group, $C_{1-6}$-alkyl, phenyl or benzyl group;

each R' is independently a hydrogen atom, $C_{1-20}$ alkyl or $C_{3-7}$ cycloalkyl;

$R^6$ is hydrogen or a $C_{1-10}$ alkyl group;

$R^{6'}$ is a $C_{1-10}$ alkyl group or $C_{6-10}$ aryl group, preferably a tertiary alkyl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0, 1 to 2; and each $R^1$ is independently a $C_{3-8}$ alkyl group.

Most preferably, the complex of use in the invention is of formula (V') or (V):

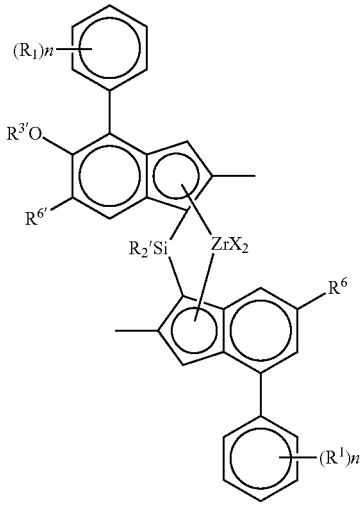

(V')

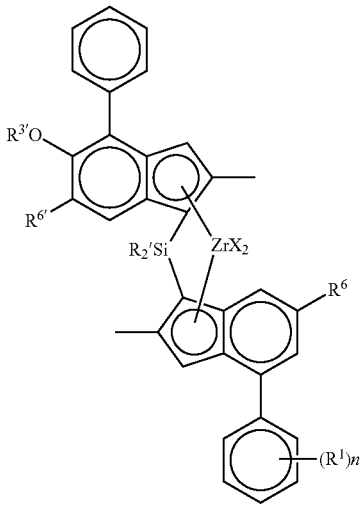

(V)

wherein each X is independently a hydrogen atom, a halogen atom, $C_{1-6}$-alkoxy group, $C_{1-6}$-alkyl, phenyl or benzyl group;

R' is independently a $C_{1-6}$ alkyl or $C_{3-10}$ cycloalkyl;

$R^1$ is independently $C_{3-8}$ alkyl;

$R^6$ is hydrogen or a $C_{3-8}$ alkyl group;

$R^{6'}$ is a $C_{3-8}$ alkyl group or $C_{6-10}$ aryl group, preferably a tertiary $C_{4-8}$ alkyl group;

$R^{3'}$ is a $C_{1-6}$ alkyl group, or $C_{6-10}$ aryl group optionally substituted by one or more halo groups; and n is independently 0, 1 or 2.

Particular Compounds of the Invention Include:

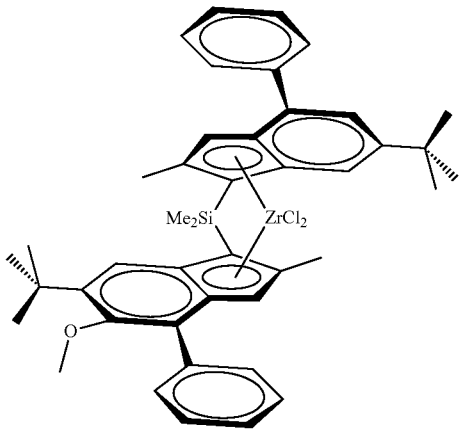

rac-anti-Me$_2$Si(2-
Me-4-Ph-6-tBu-
Ind)(2-Me-4-Ph-5-
OMe-6-tBu-
Ind)ZrCl$_2$

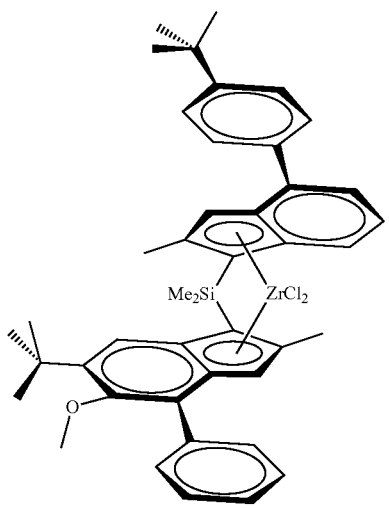

rac-anti-Me$_2$Si(2-
Me-4-(p-tBuPh)-
Ind)(2-Me-4-Ph-5-
OMe-6-tBu-
Ind)ZrCl$_2$

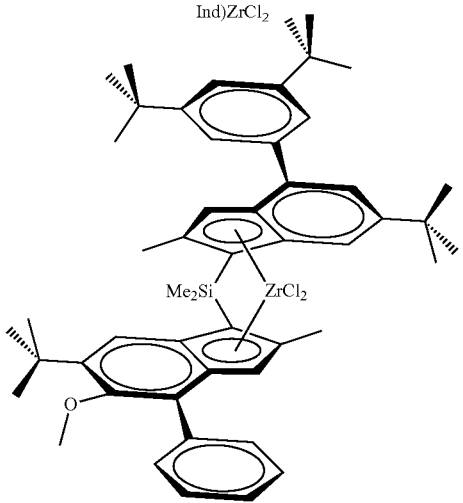

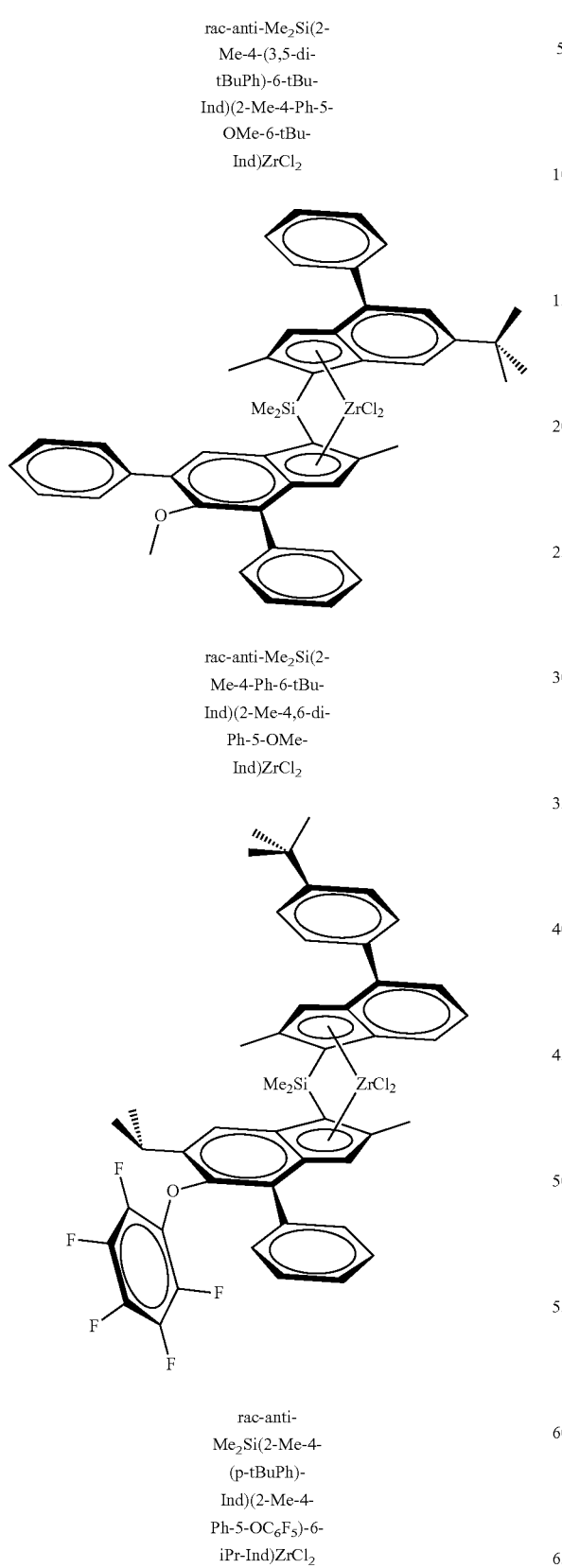
rac-anti-Me₂Si(2-Me-4-(3,5-di-tBuPh)-6-tBu-Ind)(2-Me-4-Ph-5-OMe-6-tBu-Ind)ZrCl₂
rac-anti-Me₂Si(2-Me-4-Ph-6-tBu-Ind)(2-Me-4,6-di-Ph-5-OMe-Ind)ZrCl₂
rac-anti-Me₂Si(2-Me-4-(p-tBuPh)-Ind)(2-Me-4-Ph-5-OC₆F₅)-6-iPr-Ind)ZrCl₂
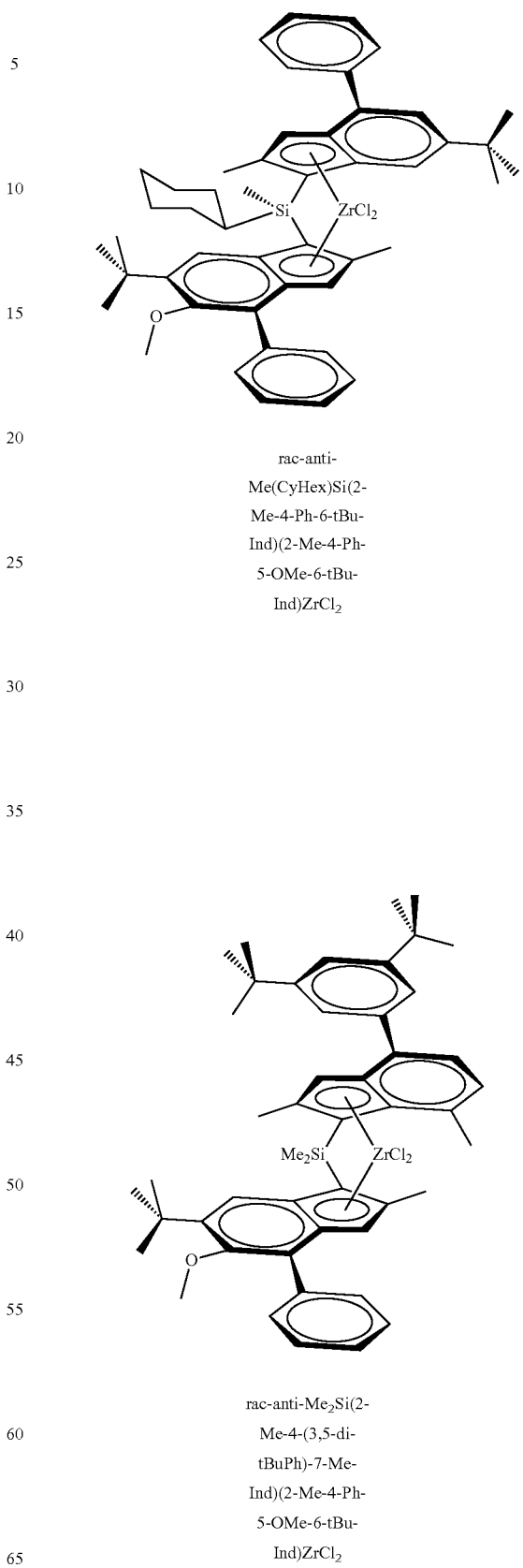
rac-anti-Me(CyHex)Si(2-Me-4-Ph-6-tBu-Ind)(2-Me-4-Ph-5-OMe-6-tBu-Ind)ZrCl₂
rac-anti-Me₂Si(2-Me-4-(3,5-di-tBuPh)-7-Me-Ind)(2-Me-4-Ph-5-OMe-6-tBu-Ind)ZrCl₂

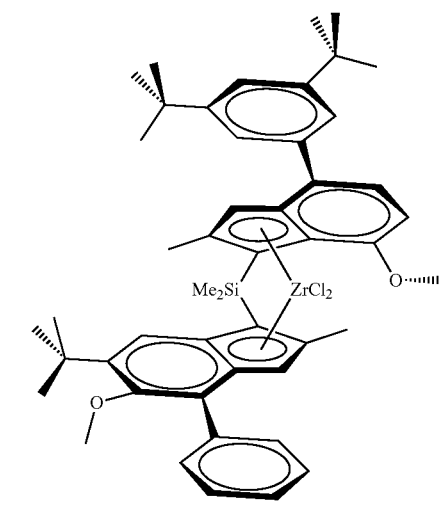
rac-anti-Me$_2$Si(2-Me-4-(3,5-di-tBuPh)-7-OMe-Ind)(2-Me-4-Ph-5-OMe-6-tBu-Ind)ZrCl$_2$
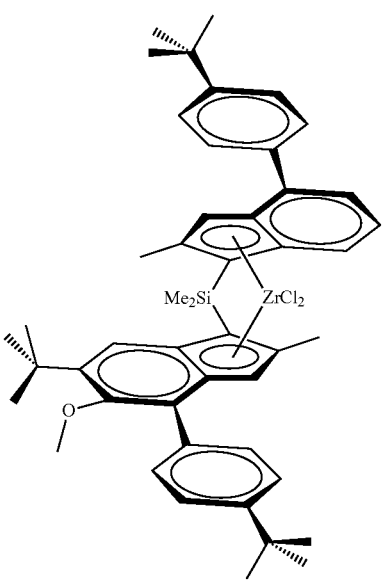
rac-anti-Me$_2$Si(2-Me-4-(p-tBuPh)-Ind)(2-Me-4-(4-tBuPh)-5-OMe-6-tBu-Ind)ZrCl$_2$
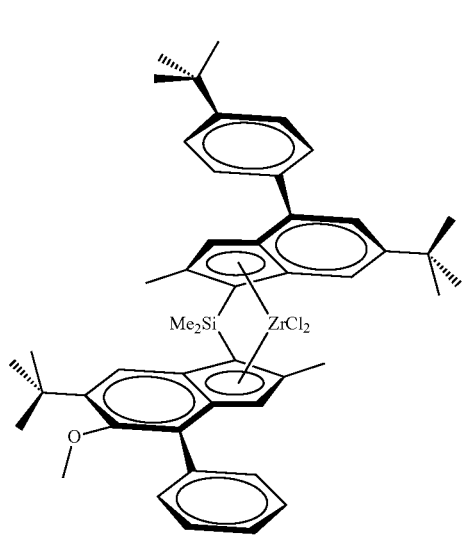
rac-anti-Me$_2$Si(2-Me-4-(p-tBuPh)-6-tBu-Ind)(2-Me-4-Ph-5-OMe-6-tBu-Ind)ZrCl$_2$
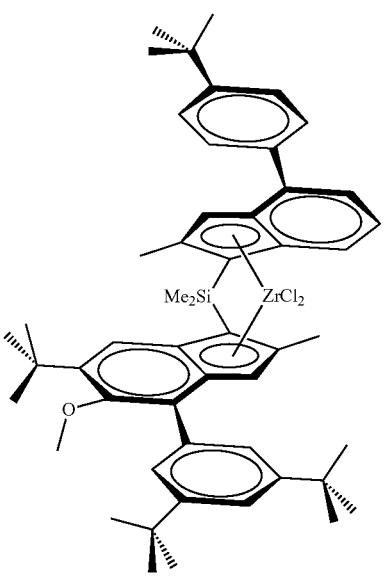
rac-anti-Me$_2$Si(2-Me-4-(p-tBuPh)-Ind)(2-Me-4-(3,5-tBu2Ph)-5-OMe-6-tBu-Ind)ZrCl$_2$

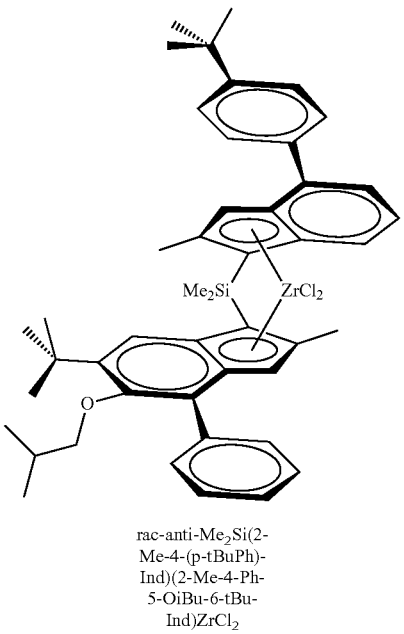

rac-anti-Me$_2$Si(2-Me-4-(p-tBuPh)-Ind)(2-Me-4-Ph-5-OiBu-6-tBu-Ind)ZrCl$_2$

Most preferably rac-anti-Me$_2$Si(2-Me-4-(p-tBuPh)-Ind)(2-Me-4-Ph-5-OMe-6-tBu-Ind)ZrCl$_2$ is used.

The ligands required to form the complexes and hence catalysts of the invention can be synthesized by any process and the skilled organic chemist would be able to devise various synthetic protocols for the manufacture of the necessary ligand materials. For Example WO2007/116034 discloses the necessary chemistry. Synthetic protocols can also generally be found in WO2002/02576, WO2011/135004, WO2012/084961, WO2012/001052, WO2011/076780, WO2013/007650, WO2015/158790 and WO2018/122134. The examples section also provides the skilled person with sufficient direction.

Cocatalyst

To form an active catalytic species it is normally necessary to employ a cocatalyst as is well known in the art. Cocatalysts comprising one or more compounds of Group 13 metals, like organoaluminium compounds or boron containing cocatalysts or combinations therefrom used to activate metallocene catalysts are suitable for use in this invention.

In a preferred embodiment of the present invention a cocatalyst system comprising a boron containing cocatalyst, e.g. a borate cocatalyst and an aluminoxane cocatalyst is used.

The single-site polymerization catalyst system used in the invention therefore can comprise (i) a complex as defined above and an aluminoxane cocatalyst.

The aluminoxane cocatalyst can be one of formula (II):

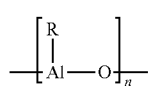 (II)

where n is from 6 to 20 and R has the meaning below.

Aluminoxanes are formed on partial hydrolysis of organoaluminum compounds, for example those of the formula AlR$_3$, AlR$_2$Y and Al$_2$R$_3$Y$_3$ where R can be, for example, C$_1$-C$_{10}$-alkyl, preferably C$_1$-C$_5$-alkyl, or C$_3$-C$_{10}$-cycloalkyl, C$_7$-C$_{12}$-arylalkyl or -alkylaryl and/or phenyl or naphthyl, and where Y can be hydrogen, halogen, preferably chlorine or bromine, or C$_1$-C$_{10}$-alkoxy, preferably methoxy or ethoxy. The resulting oxygen-containing aluminoxanes are not in general pure compounds but mixtures of oligomers of the formula (II).

The preferred aluminoxane is methylaluminoxane (MAO).

Since the aluminoxanes used according to the invention as cocatalysts are not, owing to their mode of preparation, pure compounds, the molarity of aluminoxane solutions hereinafter is based on their aluminium content.

According to the present invention, also a boron containing cocatalyst can be used.

Boron containing cocatalysts of interest include those of formula (III)

$$BY_3 \qquad (III)$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are fluorine, trifluoromethyl, aromatic fluorinated groups such as p-fluorophenyl, 3,5-difluorophenyl, pentafluorophenyl, 3,4,5-trifluorophenyl and 3,5-di(trifluoromethyl) phenyl. Preferred options are trifluoroborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(3,5-difluorophenyl)borane and/or tris (3,4,5-trifluorophenyl)borane.

Particular preference is given to tris(pentafluorophenyl) borane.

However it is preferred that as a boron containing cocatalyst borates are used, i.e. compounds containing a borate.

These compounds generally contain an anion of formula:

$$(Z)_4B^- \qquad (IV)$$

where Z is an optionally substituted phenyl derivative, said substituent being a halo-C$_{1-6}$-alkyl or halo group. Preferred options are fluoro or trifluoromethyl. Most preferably, the phenyl group is perfluorinated.

Such ionic cocatalysts preferably contain a weakly-coordinating anion such as tetrakis(pentafluorophenyl)borate or tetrakis(3,5-di(trifluoromethyl)phenyl)borate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include: tributylammoniumtetra(pentafluorophenyl)borate, tributylammoniumtetra(trifluoromethylphenyl)borate, tributylammoniumtetra(4-fluorophenyl)borate, N,N-dimethylcyclohexylammoniumtetrakis(pentafluorophenyl)borate, N,N-dimethylbenzylammoniumtetrakis(pentafluorophenyl) borate, N,N-dimethylaniliniumtetrakis(pentafluorophenyl) borate, N,N-di(propyl)ammoniumtetrakis(pentafluorophenyl)borate, di(cyclohexyl)ammoniumtetrakist (pentafluorophenyl)borate, triphenylcarbeniumtetrakis (pentafluorophenyl)borate, or ferroceniumtetrakis (pentafluorophenyl)borate.

Preference is given to triphenylcarbeniumtetrakis(pentafluorophenyl) borate, N,N-dimethylaniliniumtetrakis(pentafluorophenyl)borate, N,N-dimethylcyclohexylammoniumtetrakis(pentafluorophenyl)borate or N,N-dimethylbenzylammoniumtetrakis(pentafluorophenyl) borate According to the present invention, it is especially preferred to use an aluminoxane cocatalyst, like MAO, together with a boron containing cocatalyst, like borate cocatalyst.

Suitable amounts of co-catalyst will be well known to the skilled person.

Preferably, the amount of cocatalyst is chosen to reach below defined molar ratios.

The molar ratio of feed amounts of boron (B) to the metal ion (M) (preferably zirconium) of the metallocene boron/M may be in the range 0.1:1 to 10:1 mol/mol, preferably 0.3:1 to 7:1, especially 0.3:1 to 5:1 mol/mol.

Even more preferably, the molar ratio of feed amounts of boron (B) to metal ion (M) (preferably zirconium) of the metallocene boron/M is from 0.3:1 to 3:1 The molar ratio of Al from the aluminoxane to the metal ion (M) (preferably zirconium) of the metallocene Al/M may be in the range 1:1 to 2000:1 mol/mol, preferably 10:1 to 1000:1, and more preferably 50:1 to 600:1 mol/mol.

Catalyst System

The catalyst system used to manufacture the $C_2C_3$ random copolymers of the invention is ideally provided in solid particulate form supported on an external carrier.

The particulate support material used is silica or a mixed oxide such as silica-alumina. The use of a silica support is preferred. The skilled man is aware of the procedures required to support a metallocene catalyst.

Especially preferably the support is a porous material so that the complex may be loaded into the pores of the particulate support, e.g. using a process analogous to those described in WO94/14856, WO95/12622 and WO2006/097497.

The average particle size of the silica support can be typically from 10 to 100 µm. However, it has turned out that special advantages can be obtained if the support has an average particle size from 15 to 80 µm, preferably from 18 to 50 µm.

The average pore size of the silica support can be in the range 10 to 100 nm and the pore volume from 1 to 3 mL/g.

Examples of suitable support materials are, for instance, ES747JR produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The use of these supports is routine in the art.

Additives

The inventive $C_2C_3$ random copolymer (RACO) can optionally comprise one or more additives in a total amount of from 0.1 up to 5.0 wt %, based on the copolymer, selected from the group comprising slip agents, anti-block agents, UV stabilizers, antistatic agents, alpha-nucleating agents and antioxidants. The amount of added additives and the amount of the inventive $C_2C_3$ random copolymer (RACO) sum up to 100.0 wt %.

Such additives are commonly known to an art skilled person.

Slip agents are also commonly known in the art. Slip agents migrate to the surface and act as lubricants polymer to polymer and polymer against metal rollers, giving reduced coefficient of friction (CoF) as a result. Examples are fatty acid amides, like erucamide (CAS No. 112-84-5), oleamide (CAS No. 301-02-0), stearamide (CAS No. 124-26-5) or combinations thereof.

Examples of antioxidants which are commonly used in the art, are sterically hindered phenols
(such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1,1'-dimethylbenzyl)diphenylamine), or antioxidant blends.

Acid scavengers are also commonly known in the art. Examples are calcium stearates, sodium stearates, zinc stearates, magnesium and zinc oxides, synthetic hydrotalcite (e.g. SHT, CAS No. 11097-59-9), lactates and lactylates, as well as calcium stearate (CAS No. 1592-23-0) and zinc stearate (CAS No. 557-05-1).

Common antiblocking agents are natural silica such as diatomaceous earth (such as CAS No. 60676-86-0 (SuperfFloss™), CAS No. 60676-86-0 (SuperFloss E™), or CAS No. 60676-86-0 (Celite 499™)), synthetic silica (such as CAS No. 7631-86-9, CAS No. 7631-86-9, CAS No. 7631-86-9, CAS No. 7631-86-9, CAS No. 7631-86-9, CAS No. 7631-86-9, CAS No. 112926-00-8, CAS No. 7631-86-9, or CAS No. 7631-86-9), silicates (such as aluminium silicate (Kaolin) CAS No. 1318-74-7, sodium aluminum silicate CAS No. 1344-00-9, calcined kaolin CAS No. 92704-41-1, aluminum silicate CAS No. 1327-36-2, or calcium silicate CAS No. 1344-95-2), synthetic zeolites (such as sodium calcium aluminosilicate hydrate CAS No. 1344-01-0, CAS No. 1344-01-0, or sodium calcium aluminosilicate, hydrate CAS No. 1344-01-0)

Suitable UV-stabilisers are, for example, Bis-(2,2,6,6-tetramethyl-4-piperidyl)-sebacate (CAS No. 52829-07-9, Tinuvin 770); 2-hydroxy-4-n-octoxy-benzophenone (CAS No. 1843-05-6, Chimassorb 81)

Alpha nucleating agents like sodium benzoate (CAS No. 532-32-1); a mixture of aluminium-hydroxy-bis[2,2'-methylene-bis(4,6-di-t-butylphenyl)phosphate] and lithium myristate (commercially available as Adekastab NA-21 of Adeka Palmarole, France) or 1,3:2,4-bis(3,4-dimethylbenzylidene)sorbitol (CAS No. 135861-56-2, commercially available as Millad 3988 of Milliken, USA) can also be added.

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Usually these additives are added in quantities of 100-1.000 ppm for each single component.

Preferably at least an antioxidant is added.

Article

The present invention is not only related to the $C_2C_3$ random copolymer (RACO) itself, but also to its use and to articles comprising the inventive $C_2C_3$ random copolymer (RACO).

The $C_2C_3$ random copolymer (RACO) of this invention can be converted to an end product, i.e. an article, by using normal conversion techniques, such as injection moulding, compression moulding, blow moulding (extrusion or injection stretch blow moulding), extrusion (film, sheet, pipe, tuber, profile extrusion), film blowing, thermoforming and the like. Preferably, articles are packaging containers made by injection moulding, blow moulding or thermoforming, or packaging films made by film extrusion.

The C₂C₃ random copolymer (RACO) of the present invention is therefore suitable for the preparation of a variety of articles, like films (cast and blown film) for flexible packaging systems, such as bags or pouches for food and pharmaceutical packaging or medical articles in general as well as moulded articles.

Articles comprising the C₂C₃ random copolymer (RACO) of the present invention have sufficient thermal stability to enable sterilization treatment.

Therefore, the present invention is also directed to a sterilizable or sterilized article, preferably to a sterilizable or sterilized film, like a sterilizable or sterilized cast or blown film.

Such films can be subjected to a steam sterilization treatment in a temperature range of about 120° C. to 130° C.

In an embodiment, the present invention is related to an article, the article being an unoriented mono-layer film comprising the inventive C₂C₃ random copolymer (RACO).

Accordingly the present invention is also directed to an article, the article being an unoriented mono-layer film, like cast film or blown film, e.g. air cooled blown film, comprising at least 70 wt %, preferably comprising at least 80 wt %, yet more preferably comprising at least 85 wt %, of the instant C₂C₃ random copolymer (RACO).

The above described composition is suitable for the production of blown films as well as cast films. Preferred films are cast films.

Mono-layer films having a thickness of 5 to 300 µm, preferably 10 to 200 µm, more preferably 20 to 150 µm are suitable according to the present invention.

Films, preferably cast films, comprising the inventive C₂C₃ random copolymer (RACO) have beneficial properties (i) to (iv):

(i) The films have a sealing initiation temperature (SIT) (determined on 50 µm cast film as described in the experimental part) in the range of from 80° C. to below 120° C. Preferably, the films have a sealing initiation temperature (SIT) in the range of from 80° C. to 115° C., more preferably in the range of from 85° C. to 112° C., like in the range of from 90° C. to 110° C.

The low SIT of such a film is combined with (ii) a high hot tack force (HTF) determined on 50 µm cast film (as described in the experimental part) of above 1.5 N to 6.0 N.

Preferably, the films have a high hot tack force in the range of from 1.6 to 6.0 N, more preferably in the range of from 1.6 to 5.0 N.

The films have (iii) a haze (determined according to ASTM D 1003-00 on 50 µm cast film) of below 2.00%, preferably of below 1.50%, and more preferably of below 1.00%.

A suitable lower limit is for example 0.05%. Thus, suitable ranges are 0.05% to below 2.00%, preferably 0.10% to below 1.50% and more preferably 0.15% to below 1.00%.

The films furthermore have a haze value (determined according to ASTM D 1003-00 on 50 µm cast film) after steam sterilization at 121° C. for 30 min of below 7.00%, preferably of below 5.00%, and more preferably of below 4.00%.

A suitable lower limit is for example 0.30%. Thus, suitable ranges are 0.30% to below 7.00%, preferably 0.50% to below 5.00% and more preferably 0.80% to below 4.00%.

In addition, the films have (iv) a clarity (determined according to ASTM D1003-00 on cast films with a thickness of 50 µm) of at least 85.0% up to 100.0%, preferably of at least 90.0% and more preferably of at least 95.0%.

The clarity (determined according to ASTM D1003-00 on cast films with a thickness of 50 µm) after sterilization (steam sterilization at 121° C. for 30 min) is at least 75.0% up to 98.0 wt %, preferably of at least 80.0% and more preferably of at least 85.0%.

Thus, according to a further embodiment the present invention is also related to sterilizable or sterilized articles, whereby the articles are films and the films are characterized by (i) a sealing initiation temperature (SIT) (determined as described in the experimental part) in the range of from 80° C. to below 120° C.

(ii) a hot-tack force (determined as described in the experimental part on 50 µm cast film) of above 1.5 N to 6.0 N.

(iii) a haze (determined according to ASTM D1003-00 on cast film with a thickness of 50 µm) of from 0.05% to below 2.00% and a haze (determined according to ASTM D 1003-00 measured on a 50 µm cast film) after sterilization (steam sterilization at 121° C. for 30 min) of from 0.30% to below 7.00% and (iv) a clarity (determined according to ASTM D1003-00 on cast films with a thickness of 50 µm) of at least 85.0% up to 100.0% and a clarity (determined according to ASTM D1003-00 on cast films with a thickness of 50 µm) after sterilization (steam sterilization at 121° C. for 30 min) of at least 75.0% up to 98.0%.

Furthermore such films shall preferably have in addition a tensile modulus determined according to ISO 527-3 at 23° C. on cast films with a thickness of 50 µm in machine direction as well as in transverse direction in the range of 300 to 600 MPa, more preferably in the range of 320 to 550 MPa, like in the range of 350 to 500 MPa.

In another embodiment of the present invention, the films have a resistance factor (R-factor) according to formula $$R\text{-factor} = \frac{\text{Tensile Modulus } (MD)[MPa] * HTF[N]}{\text{Haze } (b.s.)[\%]}$$

of more than 3 000 up to 6 000.

Preferably, the resistance factor (R-factor) is above 3 200 up to 5 500, more preferably above 3 400 up to 5 000.

The resistance factor (R-factor) for films according to the present invention is determined by multiplying Tensile Modulus (MD) and hot tack force (HTF) and putting this product in relation to haze determined before sterilization.

Preferably, the above described films comprise the inventive C₂C₃ random copolymer (RACO).

A multi-layer film construction comprising at least one layer comprising the inventive C₂C₃ random copolymer (RACO) is preferably produced by multi-layer co-extrusion followed by film casting or film blowing. In this case, at least one of the outermost layers of said multi-layer film construction serving as sealing layer(s) shall comprise the inventive C₂C₃ random copolymer (RACO) as defined above. The inventive multilayer film construction shall preferably have a thickness in the range of 30 to 500 m, more preferably in the range of 50 to 400 µm, like in the range of 60 to 300 µm. The sealing layer(s) comprising the inventive C₂C₃ random copolymer (RACO) shall preferably have a thickness in the range of 3 to 50 µm, more preferably in the range of 5 to 30 µm, like in the range of 8 to 25 µm.

Films and/or multi-layer film constructions according to the present invention shall preferably be used for flexible packaging systems, such as bags or pouches for food and pharmaceutical packaging or medical articles in general.

The following definitions of terms and determination methods apply for the above general description of the invention as well as to the below examples unless otherwise defined.

Measuring Methods

Calculation of Comonomer Content of the Second Polymer Fraction (RACO-2):

$$\frac{C(A) - w(A1) \times C(A1)}{w(A2)} = C(A2) \quad (I)$$

wherein w(A-1) is the weight fraction [in wt %] of the first polymer fraction (RACO-1), w(A-2) is the weight fraction [in wt %] of second polymer fraction (RACO-2), C(A-1) is the comonomer content [in wt %] of the first polymer fraction (RACO-1), C(A) is the comonomer content [in wt %] of the $C_2C_3$ random copolymer (RACO), C(A-2) is the calculated comonomer content [wt %] of the second polymer fraction (RACO-2).

Calculation of Melt Flow Rate $MFR_2$ (230° C.) of the Polymer Fraction (RACO-2):

$$MFR(A2) = 10^{\left[\frac{\log(MFR(A)) - w(A1) \times \log(MFR(A1))}{w(A2)}\right]} \quad (II)$$

wherein w(A1) is the weight fraction [in wt %] of the polymer fraction RACO-1 w(A2) is the weight fraction [in wt %] of the polymer fraction RACO-2,

MFR(A1) is the melt flow rate $MFR_2$ (230° C.) [g/10 min] of the polymer fraction RACO-1, MFR(A) is the melt flow rate $MFR_2$ (230° C.) [g/10 min] of the $C_2C_3$ random copolymer (RACO), MFR(A2) is the calculated melt flow rate $MFR_2$ (230° C.) [g/10 min] of the polymer fraction RACO-2.

$MFR_2$ (230° C.) is measured according to ISO 1133 (230° C., 2.16 kg load).

Quantification of Microstructure by NMR Spectroscopy

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate $(Cr(acac)_3)$ resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + S\beta\delta + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}] = 100 * fE$$

The weight percent comonomer incorporation was calculated from the mole fraction:

$$E[\text{wt \%}] = 100 * (fE * 28.06) / ((fE * 28.06) + ((1 - fE) * 42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The Xylene Solubles (XCS, Wt %):

Content of xylene cold solubles (XCS) is determined at 25° C. according ISO 16152; 2005

DSC Analysis, Melting Temperature (Tm) and Crystallization Temperature (Tc): measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C.

Crystallization temperature ($T_c$) and crystallization enthalpy ($H_c$) are determined from the cooling step, while melting temperature ($T_m$) and melting enthalpy ($H_m$) are determined from the second heating step.

Flexural modulus is determined according to ISO 178 on 80×10×4 mm$^3$ test bars injection moulded in line with EN ISO 1873-2.

Tensile modulus in machine and transverse direction were determined according to ISO 527-3 at 23° C. on cast films of 50 μm thickness produced on a monolayer cast film line with a melt temperature of 220° C. and a chill roll temperature of 20° C. with a thickness of 50 μm produced as indicated below. Testing was performed at a cross head speed of 1 mm/min.

Transparency, haze and clarity were determined according to ASTM D1003-00 on cast films with a thickness of 50 μm produced as indicated below.

Sealing initiation temperature (SIT); (sealing end temperature (SET), sealing range):

The method determines the sealing temperature range (sealing range) of polypropylene films, in particular blown films or cast films. The sealing temperature range is the temperature range, in which the films can be sealed according to conditions given below. The lower limit (heat sealing initiation temperature (SIT)) is the sealing temperature at which a sealing strength of >3 N is achieved. The upper limit (sealing end temperature (SET)) is reached, when the films stick to the sealing device. The sealing range is determined on a J&B Universal Sealing Machine Type 3000 with a film of 50 μm thickness with the following further parameters:

| | |
|---|---|
| Specimen width: | 25.4 mm |
| Seal Pressure: | 0.1 N/mm$^2$ |
| Seal Time: | 0.1 sec |
| Cool time: | 99 sec |
| Peel Speed: | 10 mm/sec |
| Start temperature: | 80° C. |
| End temperature: | 150° C. |
| Increments: | 10° C. |

Specimen is sealed A to A at each sealbar temperature and seal strength (force) is determined at each step. The temperature is determined at which the seal strength reaches 3 N.

Hot Tack Force:

The hot-tack force was determined according to ASTM F1921-12—Method B on a J&B Hot-Tack Tester on a 50 μm thickness film produced on a monolayer cast film line.

All film test specimens were prepared in standard atmospheres for conditioning and testing at 23° C. (±2° C.) and 50% (±10%) relative humidity.

The minimum conditioning time of test specimen in standard atmosphere before start testing is at least 16 h. The minimum storage time between extrusion of film sample and start testing is at least 88 h.

The hot tack measurement determines the strength of heat seals formed in the films, immediately after the seal has been made and before it cools to ambient temperature.

The hot-tack measurement was performed under the following conditions.

Film Specimen width: 25.4 mm.
Seal bar length: 50 mm
Seal bar width: 5 mm
Seal bar shape: flat
Seal Pressure: 0.3 N/mm$^2$.
Seal Time: 0.5 sec.
Cool time: 99 sec.
Peel Speed: 200 mm/sec.
Start temperature: 90° C. End temperature: 140° C. Increments: 10° C.

The hot tack force was measured as a function of temperature within the temperature range and with temperature increments as indicated above. The number of test specimens were at least 3 specimens per temperature. The output of this method is a hot tack curve; a force vs. temperature curve.

The hot tack force (HTF) is evaluated from the curve as the highest force (maximum peak value) with failure mode "peel".

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

Al and Zr Determination (ICP-Method)

In a glovebox, an aliquot of the catalyst (ca. 40 mg) was weighted into glass weighting boat using analytical balance. The sample was then allowed to be exposed to air overnight while being placed in a steel secondary container equipped with an air intake. Then 5 mL of concentrated (65%) nitric acid was used to rinse the content of the boat into the Xpress microwave oven vessel (20 mL). A sample was then subjected to a microwave-assisted digestion using MARS 6 laboratory microwave unit over 35 minutes at 150° C. The digested sample was allowed to cool down for at least 4 h and then was transferred into a glass volumetric glass flask of 100 mL volume. Standard solutions containing 1000 mg/L Y and Rh (0.4 mL) were added. The flask was then filled up with distilled water and shaken well. The solution was filtered through 0.45 μm Nylon syringe filters and then subjected to analysis using Thermo iCAP 6300 ICP-OES and iTEVA software.

The instrument was calibrated for Al, B, Hf, Mg, Ti and Zr using a blank (a solution of 5% HNO3) and six standards of 0.005 mg/L, 0.01 mg/L, 0.1 mg/L, 1 mg/L, 10 mg/L and 100 mg/L of Al, B, Hf, Mg, Ti and Zr in solutions of 5% HNO3 distilled water. However, not every calibration point was used for each wavelength. Each calibration solution contained 4 mg/L of Y and Rh standards. Al 394.401 nm was calibrated using the following calibration points: blank, 0.1 mg/L, 1 mg/L, 10 mg/L and 100 mg/L. Al 167.079 nm was calibrated as Al 394.401 nm excluding 100 mg/L and Zr 339.198 nm using the standards of blank, 0.01 mg/L, 0.1 mg/L, 1 mg/L, 10 mg/L and 100 mg/L. Curvilinear fitting and 1/concentration weighting was used for the calibration curves.

Immediately before analysis the calibration was verified and adjusted (instrument reslope function) using the blank and a 10 mg/L Al, B, Hf, Mg, Ti and Zr standard which had 4 mg/L Y and Rh. A quality control sample (QC: 1 mg/L Al, Au, Be, Hg & Se; 2 mg/L Hf & Zr, 2.5 mg/L As, B, Cd, Co, Cr, Mo, Ni, P, Sb, Sn & V; 4 mg/L Rh & Y; 5 mg/L Ca, K, Mg, Mn, Na & Ti; 10 mg/L Cu, Pb and Zn; 25 mg/L Fe and 37.5 mg/L Ca in a solution of 5% HNO3 in distilled water) was run to confirm the reslope for Al, B, Hf, Mg, Ti and Zr. The QC sample was also run at the end of a scheduled analysis set.

The content for Zr was monitored using Zr 339.198 nm {99} line. The content of aluminium was monitored via the 167.079 nm {502} line, when Al concentration in test portion was under 2 wt % and via the 394.401 nm {85} line for Al concentrations above 2 wt %. Y 371.030 nm {91} was used as internal standard for Zr 339.198 nm and Al 394.401 nm and Y 224.306 nm {450} for Al 167.079 nm.

The reported values were back calculated to the original catalyst sample using the original mass of the catalyst aliquot and the dilution volume.

2. EXAMPLES

The catalyst used in the polymerization processes for the $C_2C_3$ random copolymer of the inventive example (IE1) was prepared as follows:

The metallocene (MC1) (rac-anti-dimethylsilandiyl(2-methyl-4-phenyl-5-methoxy-6-tert-butyl-indenyl)(2-methyl-4-(4-tert-butylphenyl)indenyl)zirconium dichloride)

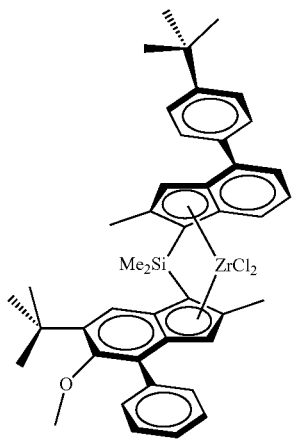

has been synthesized according to the procedure as described in WO WO2013007650, E2.

The catalyst system was prepared using metallocene MC1 and a catalyst system of MAO and trityl tetrakis(pentafluorophenyl)borate. The catalyst was supported onto silica.

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (7.4 kg) was added from a feeding drum followed by careful pressuring and depressurising with nitrogen using manual valves.

Then toluene (32 kg) was added. The mixture was stirred for 15 min. Next 30 wt % solution of MAO in toluene (17.5 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The MAO treated support was washed twice with toluene (32 kg) at 90° C., following by settling and filtration. The reactor was cooled off to 60° C. and the solid was washed with heptane (32.2 kg). Finally MAO treated SiO2 was dried at 60° under nitrogen flow for 2 hours and then for 5 hours under vacuum (−0.5 barg) with stirring. MAO treated support was collected as a free-flowing white powder found to contain 12.6% Al by weight.

Catalyst System Preparation for Inventive Examples IE1 and IE2

30 wt % MAO in toluene (2.2 kg) was added into a steel nitrogen blanked reactor via a burette at 20° C. Toluene (7 kg) was then added under stirring. Metallocene MC1 (286 g) was added from a metal cylinder followed by flushing with 1 kg toluene. The mixture was stirred for 60 minutes at 20° C. Trityl tetrakis(pentafluorophenyl) borate (336 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under N2 flow at 60° C. for 2 h and additionally for 5 h under vacuum (−0.5 barg) under stirring. Dried catalyst was sampled in the form of pink free flowing powder containing 13.9 wt % Al and 0.26 wt % Zr for Comparative Examples CE1 and CE2 a Ziegler-Natta Catalyst was Used Preparation of the Ziegler-Natta Catalyst for CE1 and CE2

Used Chemicals:

20% solution in toluene of butyl ethyl magnesium (Mg (Bu)(Et), BEM), provided by Chemtura 2-ethylhexanol, provided by Amphochem; 3-Butoxy-2-propanol—(DOWANOL™ PnB), provided by Dow; bis(2-ethylhexyl)citraconate, provided by SynphaBase TiCl4, provided by Millenium Chemicals; Toluene, provided by Aspokem Viscoplex® 1-254, provided by Evonik; Heptane, provided by Chevron Preparation of a Mg Alkoxy Compound Mg alkoxide solution was prepared by adding, with stirring (70 rpm), into 11 kg of a 20 wt % solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of TiCl4 and 1.1 kg of toluene were added into a 20 l stainless steel reactor. Under 350 rpm mixing and keeping the temperature at 0° C., 14.5 kg of the Mg alkoxy compound prepared as described above was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethylaluminium (TEAL) as co-catalyst and dicyclopentyl dimethoxy silane (D-Donor) as donor for preparing the polymers of CE1 and CE2

The polymerization for preparing the inventive $C_2C_3$ random copolymer (RACO) as well as the polymers of CE1 and CE2 were performed in a Borstar pilot plant with a 2-reactor set-up (loop-gas phase reactor (GPR 1))

In Table 1 the polymerization conditions for IE1 and IE2 are given. In Table 2 the polymerization conditions for CE1 and CE2 are given, CE3 is identical to the inventive example 1 (IE1) of EP 3064514 A1.

TABLE 1

Polymerization data (inventive)

|  | IE1 | IE2 |
|---|---|---|
| Prepoly reactor | | |
| Temperature [° C.] | 25 | 25 |
| Pressure [Pa] | 5208 | 5469 |
| Residence time [h] | 0.4 | 0.4 |
| loop reactor | | |
| Temperature [° C.] | 68 | 68 |
| Pressure [Pa] | 5385 | 5388 |
| Feed H2/C3 ratio [mol/kmol] | 0.69 | 0.69 |
| Feed C2/C3 ratio [mol/kmol] | 48.4 | 48.4 |
| Polymer Split [wt %] | 53 | 52 |
| MFR2 [g/10 min] (MFR of RACO-1) | 9.9 | 9.9 |
| C2 loop [wt %] (C2 of RACO-1) | 4.1 | 3.9 |
| Residence time | 0.5 | 0.5 |
| GPR1 | | |
| Temperature [° C.] | 75 | 75 |
| Pressure [Pa] | 2400 | 2400 |
| H2/C3 ratio [mol/kmol] | 8.0 | 8.0 |
| C2/C3 ratio [mol/kmol] | 243 | 242 |
| Polymer residence time (h) | 2.0 | 2.0 |
| Polymer Split [wt %] | 47 | 48 |
| Total MFR2 [g/10 min] | 8.4 | 8.3 |
| MFR2 [g/10 min] in GPR1 (MFR of RACO-2) | 7.0 | 6.9 |
| Total C2 [wt %] (loop + GPR1) | 4.6 | 4.4 |
| C2 in GPR1 [wt %] (C2 of RACO-2) | 5.1 | 4.9 |
| XCS [wt %] | 9.1 | 12.3 |
| Total productivity (kg PP/g cat) | 35 | 35 |

TABLE 2

Polymerization data (comparative)

|  | CE1 | CE2 |
|---|---|---|
| Prepoly reactor | | |
| Temperature [° C.] | 30 | 30 |
| Pressure [Pa] | 5469 | 5472 |
| Al/donor ratio [mol/mol] | 6 | 6 |
| Al/Ti ratio [mol/mol] | 165 | 163 |
| Residence time [h] | 0.4 | 0.4 |
| loop reactor | | |
| Temperature [° C.] | 65 | 65 |
| Pressure [Pa] | 5425 | 5400 |
| Feed H2/C3 ratio [mol/kmol] | 0 | 0 |
| Feed C2/C3 ratio [mol/kmol] | 8 | 9 |
| Polymer Split [wt %] | 33 | 37 |
| MFR2 [g/10 min] (MFR of A-1) | 1.6 | 2.0 |
| Total C2 loop [wt %] (C2 of A-1) | 4.1 | 4.4 |
| GPR1 | | |
| Temperature [° C.] | 80 | 80 |
| Pressure [Pa] | 2600 | 2550 |
| H2/C3 ratio [mol/kmol] | 6.5 | 6.0 |
| C2/C3 ratio [mol/kmol] | 35.6 | 39.3 |
| Polymer residence time (h) | 1.8 | 1.6 |
| Polymer Split [wt %] | 67 | 63 |
| Total MFR2 [g/10 min] | 1.6 | 1.4 |
| MFR2 [g/10 min] in GPR1 (MFR of A-2) | 1.6 | 1.1 |
| Total C2 [wt %] (loop + GPR1) | 5.4 | 6.0 |
| C2 in GPR1 [wt %] (C2 of A-2) | 6.0 | 7.0 |
| XCS [wt %] | 14.7 | 17.4 |
| Total productivity (kg PP/g cat) | 34 | 30 |

All polymer powders were compounded in a co-rotating twin-screw extruder Coperion ZSK 57 at 220° C. with 0.2 wt % antiblock agent (synthetic silica; CAS-no. 7631-86-9); 0.1 wt % antioxidant (Irgafos 168FF); 0.1 wt % of a sterically hindered phenol (Irganox 1010FF); 0.02 wt % of Ca-stearat) and 0.02 wt % of a non-lubricating stearate (Synthetic hydrotalcite; CAS-no. 11097-59-9).

TABLE 3

Basic polymer properties (inventive)

| Pellet | IE1 | IE2 |
|---|---|---|
| XCS [wt %] | 9.1 | 12.3 |
| Total C2 [wt %] | 4.6 | 4.4 |
| MFR2 [g/10 min] | 8.0 | 8.1 |
| Tm [° C.] | 122 | 122 |
| Tc [° C.] | 83 | 83 |
| Flexural modulus [MPa] | 767 | 772 |

TABLE 4

Basic polymer properties (comparative)

| Pellet | CE1 | CE2 | CE3 |
|---|---|---|---|
| XCS [wt %] | 14.7 | 17.4 | 19.8 |
| Total C2 [wt %] | 5.1 | 6.0 | 4.6 |
| MFR2 [g/10 min] | 1.6 | 1.4 | 7.1 |
| Tm [° C.] | 139 | 137 | 137 |
| Tc [° C.] | 103 | 101 | 98 |
| Flexural modulus [MPa] | 620 | 575 | 664 |

The inventive $C_2C_3$ random copolymers (RACOs) and the polymers of CE1-CE3 were converted to monolayer cast films with a thickness of 50 μm on a PM30 cast line (type laboratory extruder provided by Plastik Maschinenbau GmbH., Germany). The equipment consists of an extruder, chill roll with air knife and a winder.

A PP 3-zone screw with a diameter of 30 mm, 25 D length, 200 mm die, die gap 0.5 mm is applied in combination with a coat-hanger slit die assembly.

The extrusion parameters were as follows:
Extruder temperature profile: 220° C./240° C./250° C./260° C./260° C. (Melt temperature 250° C.; melt pressure 61 bar); Extruder speed: 50 rpm; Chill roll temperature: 20° C. take-off speed: 10.2 m/min In Table 5 the optical parameters (before sterilization, b.s.) as well as the sealing performance (SIT and HTF), tensile modulus and R-factor of the inventive examples can be seen. Table 6 gives the respective data for the comparative examples.

TABLE 5

Sealing performance, tensile and optics before sterilization (b.s. inventive)

|  |  | IE1 | IE2 |
|---|---|---|---|
| Tensile modulus (MD) | [MPa] | 407 | 409 |
| Tensile modulus (TD) | [MPa] | 396 | 411 |
| SIT | [° C.] | 100 | 100 |
| Hot-tack force | [N] | 1.97 | 2.19 |
| Haze b.s. | [%] | 0.21 | 0.25 |
| Clarity b.s. | [%] | 100 | 100 |
| R-factor | [(MPa*°N)/(%)] | 3818 | 3583 |

TABLE 6

Sealing performance, tensile and optics before sterilization (b.s., comparative)

|  |  | CE1 | CE2 | CE3 |
|---|---|---|---|---|
| Tensile modulus (MD) | [MPa] | 349 | 326 | 351 |
| Tensile modulus (TD) | [MPa] | 348 | 330 | 365 |
| SIT | [° C.] | 114 | 109 | 107 |
| Hot-tack force | [N] | 1.68 | 2.41 | 1.99 |
| Haze b.s. | [%] | 0.35 | 0.31 | 2.1 |
| Clarity b.s. | [%] | 99 | 99 | 96 |
| R-factor | [(MPa*°N)/(%)] | 1675 | 2534 | 333 |

The films were furthermore steam sterilized.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

The optical parameters after sterilization (a.s.) can be seen in Table 7 for the inventive examples and in table 8 for the comparative examples.

TABLE 7

Optics after sterilization (a.s., inventive)

|  |  | IE1 | IE2 |
|---|---|---|---|
| Haze (a.s.) | [%] | 3.33 | 2.43 |
| Clarity (a.s.) | [%] | 93 | 95 |

TABLE 8

Optics after sterilization (a.s., comparative)

|  |  | CE1 | CE2 | CE3 |
|---|---|---|---|---|
| Haze (a.s.) | [%] | 17.3 | 18.2 | 19.1 |
| Clarity (a.s.) | [%] | 66 | 56 | 86 |

From the above tables it can be clearly seen that the inventive $C_2C_3$ random copolymers (RACOs) are characterised by an advantageous combination of low sealing initiation temperature (SIT), high hot-tack and good optical properties, like low haze and high clarity, and a good sterilization resistance.

The invention claimed is:

1. A $C_2C_3$ random copolymer (RACO) having:
   a) an ethylene content in a range of from 2.5 to 5.2 wt %;
   b) a melt flow rate $MFR_2$ (230° C./2.16 kg) measured according to ISO 1133 in a range of from 1.0 to 20.0 g/10 min;
   c) a melting temperature Tm as determined by DSC according to ISO 11357 of from 115 to 130° C.; and
   d) a xylene cold soluble (XCS) fraction of from 0.1 wt % to below 15.0 wt %,
   wherein the C2C3 random copolymer (RACO) is bimodal in view of the comonomer content.

2. The $C_2C_3$ random copolymer (RACO) according to claim 1, further having:
   e) a crystallization temperature Tc as determined by DSC according to ISO 11357 in a range of 75° C. to 110° C.; and
   f) a flexural modulus as determined according to ISO 178 on injection moulded specimens of 500 to below 1000 MPa.

3. The $C_2C_3$ random copolymer (RACO) according claim 1, whereby the $C_2C_3$ random copolymer (RACO) comprises:
   30.0 to 70.0 wt % of polymer fraction (RACO-1) having:
   i) an ethylene content in a range of from 1.5 to 5.5 wt % and
   ii) a melt flow rate MFR2 (230° C./2.16 kg) measured according to ISO 1133 in a range of from 4.0 to 15.0 g/10 min and
   70.0 to 30.0 wt % of polymer fraction (RACO-2) having:
   i) an ethylene content in a range of from 3.5 to 7.0 wt % and
   ii) a melt flow rate MFR2 (230° C./2.16 kg) measured according to ISO 1133 in a range of from 4.0 to 12.0 g/10 min,
   whereby the ethylene content of polymer fraction (RACO-1) is lower than the ethylene content of polymer fraction (RACO-2).

4. The $C_2C_3$ random copolymer (RACO) according to claim 1, whereby the $C_2C_3$ random copolymer (RACO) is obtained in the presence of a metallocene catalyst.

5. The $C_2C_3$ random copolymer (RACO) according to claim 1, wherein the $C_2C_3$ random copolymer (RACO) has a xylene cold soluble (XCS) fraction of from 0.5 wt % to below 15.0 wt %.

6. A process for producing a $C_2C_3$ random copolymer (RACO) according to claim 1, whereby the $C_2C_3$ random copolymer (RACO) is produced by polymerizing propylene and ethylene in a sequential polymerization process comprising at least two reactors connected in series in the presence of a metallocene catalyst.

7. The process for producing a $C_2C_3$ random copolymer (RACO) according to claim 5, whereby:
   the process comprises the following steps:
   a) polymerizing in a first reactor (R1) propylene and ethylene, obtaining polymer fraction (RACO-1) of the $C_2C_3$ random copolymer (RACO),
   b) transferring said polymer fraction (RACO-1) and unreacted comonomers of the first reactor into a second reactor (R2),
   c) feeding to said second reactor (R2) propylene and ethylene,
   d) polymerizing in said second reactor (R2) and in the presence of said polymer fraction (RACO-1) propylene and ethylene obtaining polymer fraction (RACO-2)

said polymer fraction (RACO-1) and said polymer fraction (RACO-2) forming the $C_2C_3$ random copolymer (RACO) as defined in claim 1, whereby the polymerization takes place in the presence of a metallocene catalyst comprising (i) a complex of formula (I):

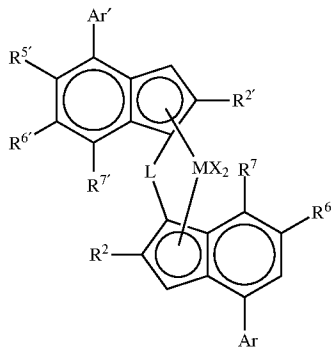

wherein

M is zirconium or hafnium; each X is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri ($C_1$-$C_{20}$-alkyl) silyl, $C_6$-$C_{20}$-aryl, $C_7$-$C_{20}$-arylalkyl or $C_7$-$C_{20}$-alkylaryl;

$R^2$ and $R^{2'}$ are each independently a $C_1$-$C_{20}$ hydrocarbyl radical optionally containing one or more heteroatoms from groups 14-16;

$R^{5'}$ is a $C_{1-20}$ hydrocarbyl group containing one or more heteroatoms from groups 14-16 optionally substituted by one or more halo atoms;

$R^6$ and $R^{6'}$ are each independently hydrogen or a $C_{1-20}$ hydrocarbyl group optionally containing one or more heteroatoms from groups 14-16;

$R^7$ is hydrogen or $C_{1-20}$ hydrocarbyl group optionally containing one or more heteroatoms from groups 14-16;

$R^{7'}$ is hydrogen;

Ar and Ar' are each independently an aryl or heteroaryl group having up to 20 carbon atoms optionally substituted by one or more groups $R^1$;

each $R^1$ is a $C_{1-20}$ hydrocarbyl group or two R1 groups on adjacent carbon atoms taken together can form a fused 5 or 6 membered non aromatic ring with the Ar group, said ring being itself optionally substituted with one or more groups $R^4$;

each $R^4$ is a $C_{1-20}$ hydrocarbyl group; and ii) a cocatalyst comprising at least one or two compounds of a group 13 metal, Al and/or boron compound.

8. The process according to claim 7, wherein as cocatalyst (ii) a cocatalyst system comprising a boron containing cocatalyst and an aluminoxane cocatalyst is used and the catalyst is supported on a silica support.

9. A sterilizable or sterilized article comprising a $C_2C_3$ random copolymer (RACO) according to claim 1.

10. Sterilizable or sterilized articles comprising a $C_2C_3$ random copolymer (RACO) having:
a) an ethylene content in a range of from 2.5 to 5.2 wt %;
b) a melt flow rate MFR2 (230° C./2.16 kg) measured according to ISO 1133 in a range of from 1.0 to 20.0 g/10 min;
c) a melting temperature Tm as determined by DSC according to ISO 11357 of from 115 to 135° C.; and
d) a xylene cold soluble (XCS) fraction of from 0.1 wt % to below 14.0 wt %, wherein the articles are films and the films comprise:
i) a sealing initiation temperature (SIT) (determined as described in the experimental part) in a range of from 80° C. to below 120° C.
ii) a hot-tack force (determined as described in the experimental part on 50 µm cast film) of above 1.5 N to 6.0 N
iii) a haze (determined according to ASTM D1003-00 on cast film with a thickness of 50 µm) of from 0.05% to below 2.00% and a haze (determined according to ASTM D 1003-00 measured on a 50 µm cast film) after sterilization (steam sterilization at 121° C. for 30 min) of from 0.30% to below 7.00% and
iv) a clarity (determined according to ASTM D1003-00 on cast films with a thickness of 50 µm) of at least 85.0% up to 100.0% and a clarity (determined according to ASTM D1003-00 on cast films with a thickness of 50 µm) after sterilization (steam sterilization at 121° C. for 30 min) of at least 75.0% up to 98.0%.

11. The articles according to claim 10, wherein the films have additionally a tensile modulus determined according to ISO 527-3 at 23° C. on cast films with a thickness of 50 µm in machine direction as well as in transverse direction in a range of 300 to 600 MPa.

12. The articles according to claim 10, wherein the films have a resistance factor (R-factor) according to formula:

$$R\text{-factor} = \frac{\text{Tensile Modulus } (MD)[MPa] * HTF[N]}{\text{Haze }(b.s.)[\%]}$$

of more than 3 000 up to 6 000, wherein

Tensile Modulus (MD) is determined according to ISO 527-3 at 23° C. on cast films with a thickness of 50 µm in machine direction, HTF is the hot-tack force measured on 50 µm cast film, and Haze (b.s.) is determined according to ASTM D1003-00 on cast film with a thickness of 50 µm before sterilization.

13. The articles according to claim 10, wherein the films are multi-layer films that comprise the $C_2C_3$ random copolymer (RACO) in a sealing layer.

14. Flexible packaging systems, selected from bags or pouches for food and pharmaceutical packaging comprising a film according claim 10.

\* \* \* \* \*